US008589126B2

(12) United States Patent
Ganai et al.

(10) Patent No.: US 8,589,126 B2
(45) Date of Patent: Nov. 19, 2013

(54) SYSTEM AND METHOD FOR MODEL CHECKING BY INTERLEAVING STATELESS AND STATE-BASED METHODS

(75) Inventors: Malay K. Ganai, Plainsboro, NJ (US); Chao Wang, Plainsboro, NJ (US); Weihong Li, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 901 days.

(21) Appl. No.: 12/753,239

(22) Filed: Apr. 2, 2010

(65) Prior Publication Data

US 2010/0305919 A1 Dec. 2, 2010

Related U.S. Application Data

(60) Provisional application No. 61/181,390, filed on May 27, 2009.

(51) Int. Cl.
*G06F 7/60* (2006.01)
*G06G 7/48* (2006.01)

(52) U.S. Cl.
USPC .................................................... 703/2; 703/6

(58) Field of Classification Search
None
See application file for complete search history.

(56) References Cited

U.S. PATENT DOCUMENTS 7,305,637 B2 * 12/2007 Ganai et al. .................... 716/103
7,711,525 B2 * 5/2010 Ganai et al. ........................ 703/2
8,005,661 B2 * 8/2011 Ganai et al. ...................... 703/22
2004/0230407 A1 * 11/2004 Gupta et al. ...................... 703/2

OTHER PUBLICATIONS

"Tuning SAT Checkers for Bounded Model Checking", Ofer Shtrichman. © Springer-Verlag Berlin Heidelberg 2000.*
"Improving SAT-based Bounded Model Checking by Means of BDD-based Approximate Traversals", Cabodi et al. Proceedings of the Design,Automation and Test in Europe Conference and Exhibition (Date'03). © 2003 IEEE.*
"Bounded Model Checking", Biere et al. vol. 58 of Advances in Computers, 2003.*
Biscoff, G., et al. "Exploiting Target Enlargement and Dynamic Abstraction Within Mixed BDD and SAT Invariant Checking" Electronic Notes in Theoretical Computer Science. vol. 119. Issue 2. Mar. 2005. pp. 33-49.
Ganai, M., et al. "Accelerating High-Level Bounded Model Checking" 2006 International Conference on Computer-Aided Design (ICCAD'06). Nov. 2006. pp. 794-801.

(Continued)

*Primary Examiner* — Omar Fernandez Rivas
*Assistant Examiner* — Nithya J Moll
(74) *Attorney, Agent, or Firm* — Joseph Kolodka

(57) ABSTRACT

A method for symbolic model checking for sequential systems using a combination of state-based and state-less approaches. A state-based method is used to compute frontier states by building transition relations on-the-fly using control flow information of the system, and performing successive image computations until a memory bound is reached, and efficiently storing only the new frontier states as disjunctive partitions of Boolean and Arithmetic expressions. A stateless method is used to check reachability of given goal states from a heuristically chosen set of frontier states until depth/time bound is reached. These two methods are alternated until one of the following occurs: all frontier states are explored, all goal states are reached, all computing resources are exhausted. Even though we do not store the entire reachable state set, we guarantee a complete coverage for terminating programs without the need to compute a fixed-point.

22 Claims, 7 Drawing Sheets

(56) References Cited

OTHER PUBLICATIONS

Ganai, M., et al. "Bang for the Buck: Improvising and Scheduling Verification Engines for Effective Resource Utilization" Fourth ACM-IEEE International Conference on Formal Methods and Models for Codesign (MEMOCODE '06). Jul. 2006. (10 Pages).

Ganai, M., et al. "Completeness in SMT-Based BMC for Software Programs" In Proceedings of the International Conference of Design, Automated and Test in Europe. Mar. 2008. (6 Pages).

Ganai, M., et al. "Enhancing Simulation With BDDs and ATPG" Proceedings of the Design Automation Conference (DAC'99). Jun. 1999. pp. 385-390.

McMillian, K. "Interpolation and SAT-Based Model Checking" In Fifteenth Conference on Computer Aided Verification (CAV 2003). vol. 2725 of LNCS . Jul. 2003. pp. 1-13.

Yang, Z., et al. "Mixed Symbolic Representations for Model Checking Software Programs" 2006 4th IEEE/ACM International Conference on Formal Methods and Models for Co-Design (MEMOCODE '06). Sep. 2006. pp. 17-26.

* cited by examiner

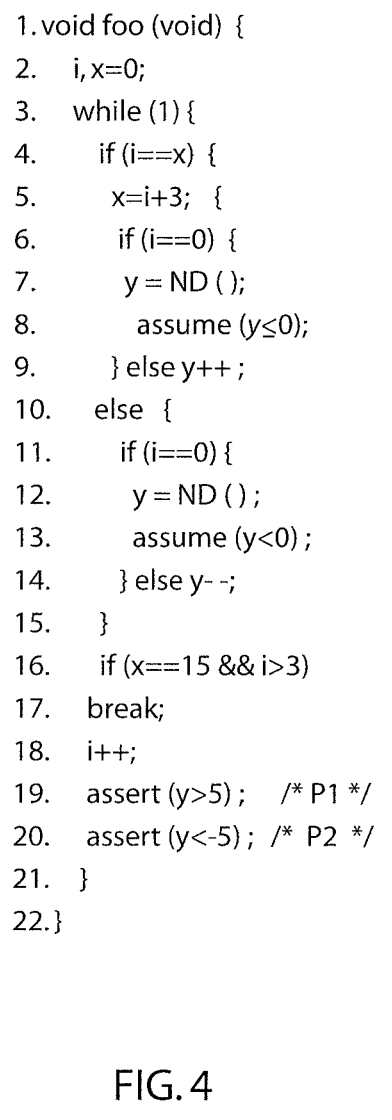

```
void foo (void) {
  i, x=0;
  while (1) {
    if (i==x) {
      x=i+3;  {
       if (i==0) {
        y = ND ( );
          assume (y≤0);
      } else y++ ;
   else  {
       if (i==0) {
         y = ND ( ) ;
         assume (y<0) ;
       } else y- -;
     }
    if (x==15 && i>3)
   break;
   i++;
   assert (y>5) ;    /* P1 */
   assert (y<-5) ;  /*  P2  */
  }
}
```

FIG. 4

SYSTEM AND METHOD FOR MODEL CHECKING BY INTERLEAVING STATELESS AND STATE-BASED METHODS

RELATED APPLICATION INFORMATION

This application claims priority to provisional application Ser. No. 61/181,390 filed on May 27, 2009, incorporated herein by reference.

BACKGROUND

1. Technical Field

The present invention relates to model checking and more particularly to systems and methods for combining stateless and state-based model checking.

2. Description of the Related Art

Bounded and unbounded model checking for verifying embedded software have been shown to scale much better when applied on models represented in first-order logic compared to models represented in propositional logic. Further, high level information can be easily provided succinctly in higher-level logic compared to propositional logic. Even with the higher scalability, there are problems in which each of these methods, i.e., bounded and unbounded model checking, fails to perform within the limited resources. These methods have complementary strengths.

Bounded Model Checking (BMC) explores all the program paths for a given bounded depth using a decision procedure (DP) for un-quantified theory. BNC does not store the program states. Such a state-less approach is good at finding bugs. However, with increasing program depths, the formula size of each BMC instance becomes larger and increasing harder to solve.

Unbounded Model Checking (UMC) symbolically computes program states at a given program point reachable from an initial state, along each program path. UMC computes successive images, where each image step essentially involves quantifications of current program state variables and primary (free) input variables. This is achieved using a decision procedure (DP) for quantified first order theory, which is a computationally more expensive operation than DP for un-quantified theory. As the program states computed at a program control point capture the union of executions of all program paths to the program point, the reachability detection for an error block becomes trivial. Note that as the program state is computed for each program path, there is a potential memory blow up when there are many conditional paths. Further, a separate call to BMC is made to generate the witness trace when the reachability of error block is detected.

SUMMARY

A method for symbolic model checking of sequential systems includes alternating between state-based and state-less symbolic model checking methods, stored on computer readable storage media, by: performing symbolic state traversal (ST) to compute frontier states in successive steps of the state-based method, wherein each step includes: building transition relations between successive sequential depths using control flow reachability information of the system on-the-fly; and performing image computations using a transition relation from the frontier states computed in previous steps to obtain image states, wherein the frontier states include a set of states reachable at a depth d from initial states and are represented as disjunctive partitions of Boolean and Arithmetic expressions. Bounded model checking (BMC) is performed in the state-less method to check reachability of given goal states from the frontier states along paths of bounded length by building and unrolling the transition relations on-the-fly using control flow reachability information, without computing or storing intermediate reachable states. The frontier states are selected by both the methods in a prioritized order that increases the likelihood of reaching the goal states. The two methods are alternated until one of the following occurs: no frontier state remains to select from; all goal states are shown reachable from the frontier states; and available resources are exhausted.

A system for symbolic model checking of sequential systems includes a model checking program stored in on a memory device and, when executed by a processor, alternates between state-based and state-less symbolic model checking methods. The model checking program includes a state-based module configured to perform symbolic state traversal (ST) to compute new frontier states in successive steps by building transition relations between successive sequential depths on-the-fly using control flow reachability information of the system and performing image computations using a transition relation from the frontier states computed in previous steps to obtain image states, wherein the frontier states include a set of states reachable at a depth d from initial states and are represented as disjunctive partitions of Boolean and Arithmetic expressions. The model checking program includes a stateless module configured to perform bounded model checking (BMC) to check reachability of given goal states from the frontier states along paths of bounded length by building and unrolling the transition relations on-the-fly using control flow reachability information, without computing or storing intermediate reachable states. The frontier states are selected by both the method model checking modules in a prioritized order that increases the likelihood of reaching the goal states. The two model checking modules are alternated until one of the following occurs: no frontier state remains to select from; all goal states are shown reachable from the frontier states; and available resources are exhausted.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a sample C program;

DETAILED DESCRIPTION OF PREFERRED EMBODIMENTS

Figure 1:
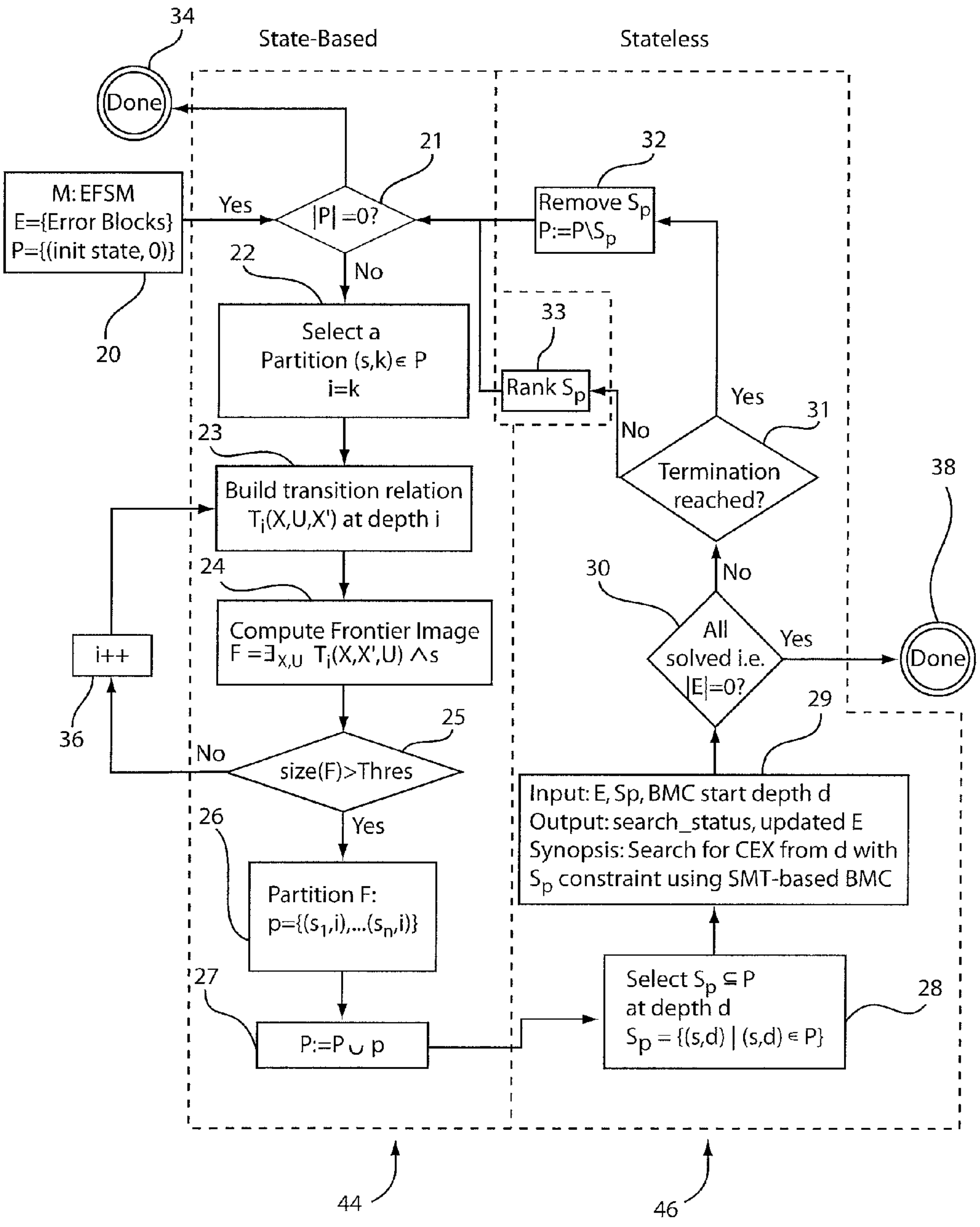
FIG. 1 is a block/flow diagram describing a model checking system/method which combined stateless and state-based model checking in accordance with one illustrative embodiment.

State-based model checking methods comprise computing and storing reachable state-space. Stateless-based methods directly reason on reachable paths, thereby avoiding computing and storing reachable states explicitly. The state-based symbolic methods use iterative quantification steps to compute reachable states and are generally faster when the reachable state-space at each quantification step can be represented compactly. However, such a condition occurs rarely for large systems, and therefore, such methods suffer from memory explosion. In contrast, the state-less symbolic methods-based on decision procedures are generally faster when path formula are small, but tend to perform poorly for longer paths.

In accordance with the present principles, complementary strengths of these methods are combined to verify embedded systems efficiently. These methods are interleaved using a decidable subset of first-order logic, to systematically explore the state space, without storing the entire state space. Specifically, we target deeper and corner cases bugs that could not be found by either state-based or state-less methods in isolation, for a given resource limit. In one embodiment, the Presburger-based Symbolic technique (state-based), and SMT-based Bounded Model Checking (stateless) are combined in a tightly integrated tool called a HMC (Hybrid Model Checker). State-based and state-less approaches are combined to improve overall performance and provide a robust solution not achievable using any single method. State-based and state-less high-level model checking are interleaved to systematically explore a complete state space.

A state-based approach such as MIX model checking may be employed to compute a reachable state set in a breadth-first search (BFS) up to some depth d (using some heuristic HD. The state sets are represented as a set of polyhedra (conjunction of linear equations) F. We partition the set F into disjoint sets (using some heuristic H2) $s_i$ such that $F=\cup s_i$, and $s_i \cap s_j = \emptyset$ for $i \neq j$. We store these partitions in a set P. We then select a set of partitions $S_p \subseteq P$ (using some heuristic H3). With each partition $S_p$ as the state constraint at depth d, we use satisfiability modulo theories (SMT)-based bounded model checking (BMC) from the depth d to check if error blocks can be reached or show that termination is reached.

If all the error blocks are reachable, we are done; otherwise, we continue with a state-based approach for BFS traversal from some partition (selected using Heuristic H4). We thus interleave the state-based and state-less model checking guided by various heuristics H1-H4 where the stateless portion of the check is incorporated into the heuristics.

The various heuristics may be described as follows. Heuristic H1 can be decided by the size of reachable set (in terms of number of polyhedra) and set of control states reachable at the depth. If the size is greater than some threshold, we stop the BFS traversal of state-based approach. Heuristic H2 can be decided by the size of the partition (in terms number of polyhedra) and number of control states reachable at the depth. Heuristic H3-H4 can be decided by the some prioritizing function that ranks the partition based on the likelihood of reaching the error block(s). This work provides a framework for integrating state-based and state-less approaches, which can easily be parallelized. Further, due to state partitioning, each of the methods demands less memory resources, and is independent.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In one embodiment, model checking is employed for automated verification of hardware and safety-critical embedded software. Automated verification techniques are employed to reduce the high costs of faulty hardware/software incurred in repairs and maintenance. Compared to other formal based methods, model checking has several advantages over simulation, testing and deductive reasoning. Given a (finite) model of a system, model checking methods explore the state space in an exhaustive and systematic manner to guarantee the validity of generic temporal property specifications. Besides proving the correctness, model checking is capable of providing debugging information, i.e., witnesses to failing properties. Model checking methods in general do not scale, but are sound and complete with respect to the model. Symbolic model checking has potential to analyze larger state systems, compared to explicit model checking. Model checking techniques based on symbolic techniques are preferable in accordance with the present principles. Symbolic model checking techniques can be classified broadly into two categories: stateful and stateless.

A stateful (or simply state-based) symbolic model checking—such as based on BDD and composite representation comprise computing and storing reachable state-space. Given a set of states, these methods use quantification steps to obtain a reachable set of states, in either forward (a.k.a. image) or backward directions (a.k.a. pre-image). Such a method is also called unbounded model checking as it explores the entire reachable state space, without requiring a preset bound on the number of quantification steps. A stateless symbolic model checking—such as SAT-based bounded model checking (BMC) and SMT (Satisfiability Modulo Theory)-based model checking directly reasons on reachable paths; thereby avoiding computing or storing reachable states explicitly.

Bounded and unbounded model checking for verifying embedded software scale much better when applied on models represented in first-order logic compared to models represented in propositional logic. Further, high level information can be easily provided succinctly in higher-level logic compared to propositional logic.

Note, in an SMT-based BMC, $\psi$ is a quantifier-free formula in a decidable subset of first order logic, which is then checked for satisfiability by an SMT solver. In SMT-based BMC all the paths are explored for a preset bounded depth using a decision procedure for un-quantified theory. SMT-based BMC does not require storage of states. Such a state-less approach is good at finding safety critical bugs. However with the increasing program depths, the formula size of each BMC instance becomes larger and increasing harder to solve. In an unbounded model checking (UMC) approach for verification of infinite-state reactive system, composite representation may be used to combine the relative strengths of two symbolic representations: BDDs for Boolean formulas and finite unions of convex polyhedrons for formulas in Presburger arithmetic to handle the rich data types and complex expressions. To verify large sequential programs such as C programs, a mix representation in a symbolic model checking algorithm, referred to as MIX, may be employed and combined with strategies specific to such sequential programs. In contrast to SMT-based BMC, MIX performs fix-point reachability computation with repeated existential quantification. Specifically, MIX computes symbolically the program states at a given program point reachable from an initial state, along each program path. The method computes successive images, where each image step essentially involves quantifications of current program state variables and primary (free) input variables. This is achieved using a decision procedure for quantified first order theory such as Presburger solver, which is a computationally more expensive operation than the decision procedure for un-quantified theory. As the program states computed at a program control point captures the union of executions of all program paths to the program point, the reachability detection for an error block becomes trivial. Note that as the program state is computed for each program path, there is a potential memory blow up when there are many conditional paths. Even with the higher scalability, there are examples where each of these methods i.e., bounded and unbounded model checking fails to perform within the limited resources.

Referring now to the drawings in which like numerals represent the same or similar elements and initially to FIG. 1, a block/flow diagram shows a system/method for exploring a complete state space using a combination of stateless and state-based model checking in accordance with one illustrative embodiment. The present principles interleave state-based 44 and state-less 46 high-level model checking to systematically explore the complete state space. A state-based approach 44, such as, MIX model checking, may be employed to compute a reachable state set in a breadth-first search (BFS) up to some depth d (using heuristic H1). The state sets are represented as a set of polyhedra (conjunction of linear equations) F. The set F is partitioned into disjoint sets (using heuristic H2) $s_i$ such that $F=\cup s_i$, and $s_i \cap s_j = \emptyset$ for $i \neq j$. These partitions are stored in a set P. A set of partitions $S_p \subset P$ are selected (using heuristic H3). With each partition $S_p$ as the state constraint at depth d, we use SMT-based BMC from the depth d to check if error blocks can be reached or show that termination is reached. If all the error blocks are reachable, we are done. Otherwise, we continue with a state-based approach for BFS traversal from some partition (selected using Heuristic H4). We thus interleave the state-based and state-less model checking 46 guided by various heuristics H1-H4. Heuristic H1 can be decided by the size of reachable set (in terms of number of polyhedra) and set of control states reachable at the depth. If the size is greater than some threshold, we stop the BFS traversal of the state-based approach. Heuristic H2 can be decided by the size of the partition (in terms number of polyhedra) and number of control states reachable at the depth. Heuristic H3-H4 can be decided by the some prioritizing function that ranks the partition based on the likelihood of reaching the error block(s).

This work provides a framework for integrating state-based and state-less approaches, which can easily be parallelized. Further, due to state partitioning, each of the methods demands less memory resources, and is independent. A deeper search for BMC is enabled by replacing unrolled transitions with a reachable set. Note the reachable set can be much smaller in size than the unrolled transition relation. If not, we use partitioning of the state space to keep it small.

The present invention provides a robust state space search solution as compared to either state-based or state-less approach in isolation. It has been specifically targeted for analyzing large systems by making the algorithm inherently parallelizable.

In block 20, an extended finite state model EFSM, with a set of Error Blocks E, and a partition set $P=\{(I,0)\}$ with initial state I are given. In block 21, if set P is empty, then we stop (block 34). Otherwise, go to block 22. In block 22, a partition (s,k) is selected heuristically (H1) where s represents a set of states reachable at some depth k. Set s is represented using polyhedra, i.e., a conjunctive set of linear equations. In block 23, a transition relation $T_i$ (X, U, X') is constructed at depth i where X, U, X' represent the current state variables, input variables and next state variables, respectively. The transition relation is built using control state reachability (CSR) information, i.e., only for those blocks that are statically reachable at depth i, and have outgoing edges.

In block 24, a forward or frontier image F is computed from set s by quantifying a current state X and input variables U from its product with $T_i$. This is computed as: $F=|_{X,U}T_i(X, X', U)\hat{}s$. In block 25, if the size of image F is larger than a threshold, then go to block 26. Otherwise, i is incremented in block 36 and processing continues with block 13.

In block 26, F is partitioned heuristically (H2) into a set $p=\{(s_i,i), \ldots, (s_n,i)\}$ such that $F=\cup s_a$, and $s_a \cap s_b = \emptyset$ for $a \neq b$. In block 27, the set P is updated with p, i.e., $P:=P\cup p$. In block 28, a set $S_p \subset P$ is selected such that $S_p=\{(s,d)|(s,d)\in P\}$ at some depth i (H3).

Using the set $S_p$ as a state constraint depth d, starting BMC depth d, we invoke SMT-based BMC to check for counter-examples (CEX) for the error blocks E in block 29. If we find CEX, we update the set E. In block 30, if all error blocks are reached i.e. $|E|=0$, we stop in block 38. If for the input state constraint $S_p$, we reach the completeness threshold, i.e., we explored all the paths, we return "termination reached" status. Otherwise, we return when a predetermined resource is exhausted. If termination reached status is true in block 31, we go to block 32; else go to block 33.

In block 32, we remove the subset $S_p$ from the set P i.e. $P=P\backslash S_p$ and return to block 11. In block 33, we rank the partition $S_p$ heuristically (H4), that will help partition selection in blocks 22 and 28.

Witness Generation: We now describe an efficient way to generate witness traces without unrolling the transition to the length of the entire trace. Let $(S_1,d_1)$, $(S_2,d_2)$, $(S_3,d_3)$, . . . , $(S_n,d_n)$ be the partition chains obtained using block 22-25. Let $(S_n,d_n)$ be the constraint used in SMT-based BMC to obtain the CEX at block 29. We start from the last witness trace segment. We use data flow analysis (on the single trace) to obtain the needed data values in the control block at the start of the trace, i.e., at depth $d_n$. These values become a new goal. We then use SMT-based BMC to find the error trace segment with start depth $d_{n-1}$ with state constraint $S_{n-1}$. This process is repeated, until we find all the segments of the error trace.

In accordance with the present principles, the present embodiments use interleaved high-level model checking for both state-based and state-less model checking. We have interleaved state-based and state-less based high-level model checking to provide a robust and systematic exploration of state space search. Static information is employed to build transition relations dynamically. We do not build an entire transition relation for computing a forward image (see block 23). Rather, we use statically computed information such control state reachability to build the transition relation dynamically at each depth.

Heuristics are employed in blocks 22, 26, 28, and 33 making the method more adaptable. Several tasks are independent and potentially parallelizable. The present embodiments are be easily parallelized. Block 22-25 and 29 are independent. Further, each partition can be independently chosen for computing a reachable set or state search using BMC. For witness generation, complete unrolling is not needed for the witness length. We compute the witness trace in segments. Overall, the present approach is less resource demanding and thereby more scalable than each of the methods (UMC and BMC) in isolation.

Figure 2:
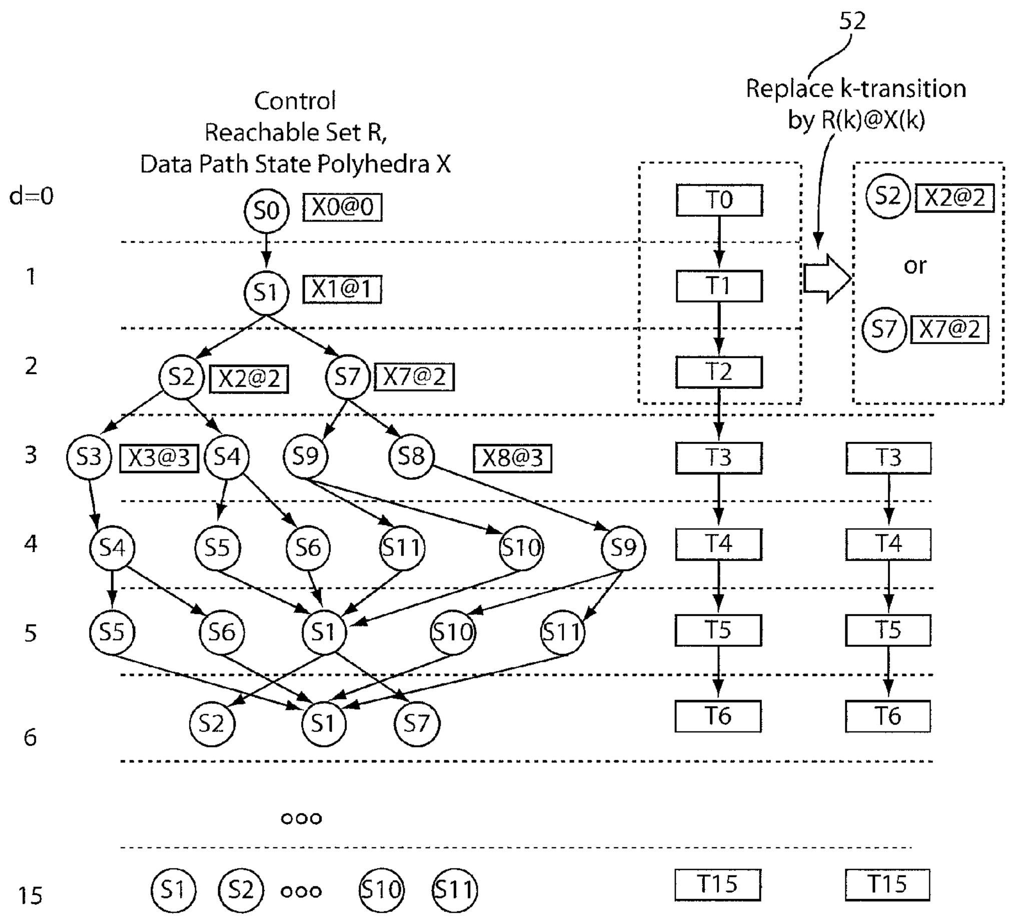
FIG. 2 is a diagram showing a control flow graph with control states unrolled to a depth 15 and corresponding transitions which include replaced transitions in accordance with one illustrative embodiment.

Referring to FIG. 2, a diagram is shown for demonstrating an example of dynamically replacing transitions with sets without unrolling the full depth of a program in accordance with the present principles. Depth d is illustratively depicted for 15 levels. Set S0-S11 are shown in a polyhedra. Data path state polyhedra are depicted by an XN, where N corresponds to a set. The depth is indicated by @M where M is the depth. A control reachable set is indicated by R. Transitions are indicated by TN where M is the depth. A deeper search for BMC is enabled by replacing the unrolled transitions T0-T2 with a reachable set R at depth 3. In block 52 replace k-transition by R(k)@X(k). Therefore, T0-T2 are replaced by set S2 (X2@2) or S7 (X7@2). Note the reachable set (R) can be much smaller in size than the unrolled transition relation. If not, we use partitioning of the state space to keep R small.

Figure 3:
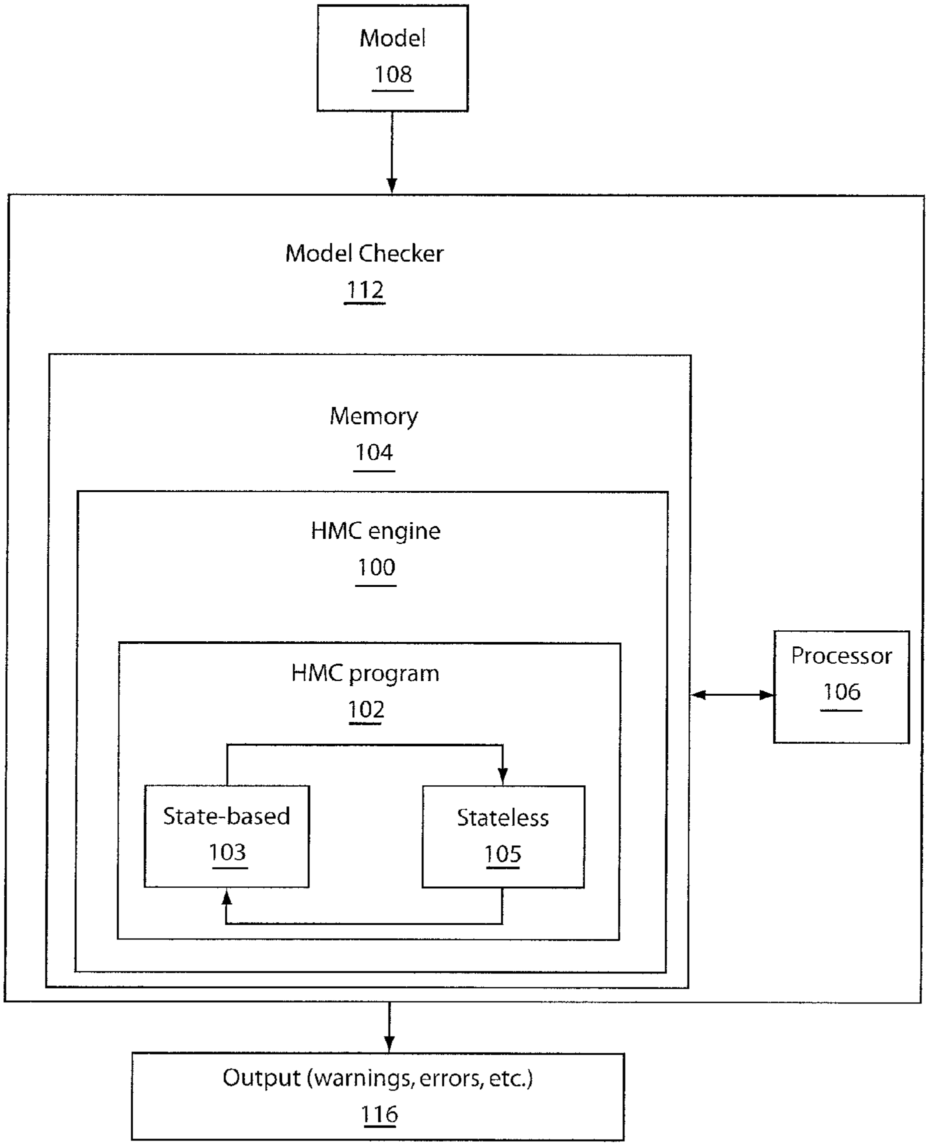
FIG. 3 is a block diagram describing a model checking system in accordance with one illustrative embodiment.

Referring to FIG. 3, a Hybrid Model Checking (HMC) verification engine 100 for embedded software systems combines the complementary strengths and weakness of the state-based and stateless methods to verify embedded systems efficiently, in an effort to improve the overall performance and provide a robust solution not achievable using any single method. Specifically, deeper and corner case bugs are targeted that could not be found by either state-based or state-less method in isolation, for a given resource limit.

A system 112 for model checking using a combination of state-based and state-less approaches is illustratively depicted. Engine 100 may include a program 102 stored on a memory device 104 and, when executed with a processor 106 is configured to perform state-based and stateless model checking to systematically explore a complete state space in a model 108 to be checked. The program 102 is includes a state based module 103 and a stateless module 105, each being configured to perform a respective model check and to switch therebetween as described herein. The system 112 outputs bugs, error information, warnings etc. in block 116.

For embedded programs that require a high degree of reliability, dynamic memory allocation and recursion are typically discouraged. The present focus is on verifying such low-level embedded programs under the assumptions of finite recursion and finite data. We formulate common design errors such as array bounds violations, null pointer de-referencing, use of uninitialized variables, user-provided assertions as reachability properties, etc. and solve them using BMC.

In our hybrid procedure, we interleave state-based and stateless model checking using decidable subset of first-order logic to systematically explore the complete state space. Our approach generates multiple sub-tasks, wherein each subtask is solved individually by the underlying state-based/stateless model checking engines. State-based unbounded model checking approach is used to compute the reachable state set in a breadth-first search (BFS). The state sets are represented as a set of polyhedra (conjunction of linear equations). To keep the size of polyhedra within memory limits, a state set D (previously designated P) is partitioned (using some state partitioning criteria) into disjoint sets $\{D_1, \ldots, D_m\}$ $D_i \cap D_j = \theta$, $i \neq j$, where each $D_i$ has a simpler representation. A disjunctive image computation strategy is employed to carry out on such a decomposed state sets. Frontier state sets are stored as a set of disjuncts, F.

Given such a frontier set F, a disjunct state D is selected (using some state prioritization criteria). Such a disjunct state is reachable at some depth k from the initial states. The disjunct state is encoded into an SMT(LIA) constraint, and the encoded constraint is used as an initial state constraint in an SMT-based BMC. At each BMC depth, a check is made to show that an error block Err is reachable from D, or to show that the Err block is unreachable from D using some completeness criteria. The set F is pruned accordingly. When some BMC bound is reached, the disjunctive image computation resumes using the updated frontier set F.

We base our state partitioning criteria on the size of reachable set (in terms of number of polyhedra) and set of control states reachable at the depth. For state prioritization, we use some prioritizing function that ranks the state sets based on the likelihood of reaching the error block(s). The prioritizing function is preferably application dependent and any number of function s may be employed.

We use control state reachability information in both bounded and unbounded model checking to simplify the computation steps. Since state-based methods are memory sensitive in general, we use a memory bound to switch from a state-based to a state-less method. On the other hand as stateless methods are depth/time sensitive, we use depth/time bound to switch from a stateless to a state-based method.

A difference from all previous combination strategies is that we do not store the reachable states at all intermediate steps, and yet give the completeness guarantee without computing fixed-point computation. We use a completeness threshold criteria in BMC that can be computed efficiently for terminating programs.

In one embodiment, our approach combines a Presburger-based Symbolic technique (state-based), and SMT-based Bounded Model Checking (stateless) in a tightly integrated tool HMC 100. This tool 100 overcomes the limitations of the state-based and state-less approaches, thereby, enabling deeper searches for the bugs. Further, our task partitioning is especially targeted to achieve the following: a) to overcome the peak memory requirement of a single server and b) to exploit servers with many-core CPUs efficiently. We achieve these by making the subtasks with small memory footprints. We build the transition system on-the-fly for both state-based and state-less model checking engines. Instead of using fixed-point computation for termination, we use the completeness criteria in BMC. We make the subtasks independent so that they can be solved individually with minimum sharing of partial results.

Mixed Expressions: we consider symbolic formulas with Boolean expressions bool-expr and integer term expressions int-expr in Presburger arithmetic, a decidable subset of first-order theory. We use the usual notations ∃, ∀ to denote the quantifiers. Integer term expressions comprise linear operations such as addition (+), subtraction (−), multiplication by constant c(·c) on integer constants int-const (∈Z, a set of integers), integer variable int-var, or int-expr. Boolean expressions include Boolean operations such as "and" (∧), "or" (∨), "xnor" (⊗), and "not" (¬) on bool-const (∈{false, true}), bool-var (Boolean variables) or bool-expr. A relation operator |∈{=,≤,<, ≥,>} is a Boolean term expressed on two int-expr terms x, y, i.e., x|y. An "if-then-else" operator, is an integer term expression on a Boolean term and two integer terms, i.e. ITE(bool-expr, int-expr, int-expr).

For a given formula ϕ with Boolean and integer terms, we use B to denote the set of bool-expr, and Z denote the set of int-expr. There are two ways to represent such a formula ϕ depending on how relation and ITE operations are expressed. Consider a relation expression of the form, b:=(x|y), b∈B, x, y∈Z. We have the following two representations:

CNF:(b−(x|y)·(−b(x|y))

DNF:(b·−(x|y)−(−b·−(x|y)).

Similarly, consider the ITE expression of the form z:=ITE $(s,z_1,z_0)$, s∈B,z,$z_0$,$z_1$∈Z. We have the following two representations:

CNF:$(\neg s \vee (z=z_1)) \wedge (s \vee (z=z_0)$

DNF:$(s \wedge (z=z_1)) \vee (\neg s \wedge (z=z_0))$.

We use the CNF representation for unquantified decision problems, while DNF representation for simplifying quantified formulas.

Solving Decision Problems: Satisfiability Modulo Theories (SMT) is the problem of deciding the satisfiability of a first-order formula with respect to a background decidable first-order equational theory T(SMT(T)). A Satisfiability Modulo Theory (SMT) problem for a theory T, denoted as SMT(T) comprises Boolean combination of theory T; given a formula ϕ, determine whether ϕ is T-satisfiable, i.e., whether there exists a model of T that is also a model of ϕ. We use a SMT-solver to decide a quantifier-free Presburger arithmetician SMT (LIA) formula, expressed in CNF over mixed expressions. Recently, SMT (LIA)-solvers are proposed based on Davis-Putnam-Logemann-Loveland (DPLL)-style that solve SMT (LIA) formula by combination of Boolean SAT and LIA-solver using incremental Simplex-based methods. Empirically, these solvers perform much better than solvers based on a Fourier-Motzkin variable elimination method. LIA is Liner Integer Arithmetic.

Consider a quantified Presburger formula, Ω in DNF representation as follows:

$$\Omega = \bigvee_i \Omega_i^B \wedge \Omega_i^I \tag{1}$$

where disjuncts $\Omega_i^B$ and $\Omega_i^I$ denote the formulas in Boolean logic and Presburger arithmetic, respectively. One goal is to carry out the various set-theoretic operations on each disjunct separately, using suitable simplifiers for that logic, and combine the results back into DNF representations. We now discuss the basic operations to achieve the same.

Let $v^I$ and $V^B$ denote the set of integer and Boolean variables in the DNF representation of Ω. As the formulas are type-consistent, there is no sharing of variables, i.e., $v^B \cap v^I = \theta$.

Consider two Presburger formulas with finite DNF representation, i.e., $f=\vee_{i=1}^{n_f}(f_i^B \wedge f_i^I)$, and $g=\vee_{j=1}^{n_g}(g_j^B \wedge g_j^I)$, following set operations union (∪), conjunction (∩), negation (¬), and existential quantification (∃) are defined to obtain equivalent DNF representations.

$$f \vee g \overset{def}{=} \left(\bigvee_i^{n_f} (f_i^B \wedge f_i^I)\right) \vee \left(\bigvee_{j=1}^{n_g} (g_j^B \wedge g_j^I)\right) \tag{2}$$

$$f \wedge g \overset{def}{=} \bigvee_{i=1}^{n_f} \bigvee_{j=1}^{n_g} (f_i^B \wedge g_j^B) \vee (f_i^B \wedge g_j^B) \tag{3}$$

$$\neg f \overset{def}{=} \bigvee_{k=0}^{n_f} \left(\bigwedge_{i=1}^{k} \neg f_i^B \wedge \bigwedge_{j=k+1}^{n_f} \neg f_j^I\right) \tag{4}$$

$$\exists_{v^B,v^I} f \overset{def}{=} \bigvee_{i=1}^{n_f} (\exists_{v^B} f_i^B) \wedge (\exists_{v^I} f_i^I) \tag{5}$$

A number of DNF terms for these operations in general are as follows: $O(n_f+n_g)$ for union, $O(n_f \times n_g)$ for conjunction, $O(2^{n_f})$ for negation, and $O(n_f)$ for existential quantification. Later, in our representation of transition relation, we will choose a suitable disjunctive partitioning of the transition relation using control flow information so that these operations can be handled efficiently. We use the known CUDD package to represent and simplify Boolean formulae, and the known Omega library, to represent and simplify Presburger formulae.

An Extended Finite State Machine (EFSM) model M may include a 3-tuple C, X, T where C is a set of control states (or blocks), X is an n dimensional space of valuations of a set of n datapath variables, T is a set of 4-tuple ($c_i$, $d_i$, $c_j$, $d_j$) transitions where $c_i$,$c_j$∈C, and $d_i$,$d_j$∈X. An ordered pair ⟨$c_i$,$d_i$⟩∈C×X is called a state of M. Let $g_{ij}$:X↦B={0,1} denote a Boolean-valued control transition relation associated with the control transition from $c_i$ to $c_j$. Let $u_i$:D×↦D denote an data transition relation associated with the update assignments in the control state $c_i$. Let Γ:C×C↦{0,1} denote a Boolean predicate such that for $c_i$,$c_j$∈C, Γ($C_i$,$c_j$)=1 if and only if $g_{ij}$ is defined.

We use C to represent a symbolic variable that takes the values from the sets C. We use X to denote a set of n datapath variables i.e., X={$x_1$, . . . , $x_n$}, taking values from the set X . Let $X=X^B \times X^I$ where $X^B$, and $X^I$ represent the set of Boolean and integer variables, respectively. Further, we use C' and X' to denote the next state values taken by these variables, respectively.

A transition from a state ⟨$c_i$, $d_i$⟨ to ⟩$c_j$,$d_j$⟩, under enabling predicate $g_{ij}$, and update relation $u_i$ is denoted as $T_{ij}$⟨$c_i$$d_i$⟨→⟩$c_j$,$d_j$⟩.

A transition relation for the entire model M , represented as T(C, X , C', X'), can be viewed as disjunctions of transitions $T_{ij}$, i.e., $$T \overset{def}{=} \bigvee_{\Gamma(c_i,c_j)=1} (C = c_i \wedge C' = c_j) \wedge T_{ij} \tag{6}$$

The transition relation for each $T_{ij}$ is given as $$T_{ij} \stackrel{def}{=} g_{ij} \wedge u_i. \tag{7}$$

Let $x'_k \leftarrow e_{i,k}$ denote an update of variable $x_k$ with an expression $e_{i,k}$ in a control state $c_i$. We obtain the corresponding update relation $u_i$ as a conjunction of such updates, $$u_i \stackrel{def}{=} (C = c_i) \wedge \bigvee_{k=1}^{k=n} (x'_k = e_{i,k}) \tag{8}$$

Note, $x'_k = x_k$ if a variable $x_k$ is not updated.

A SOURCE (SINK) state is a unique control state with no incoming (outgoing) transition. Given two predicates f and g, we define a constraint (or simplify) operator, denoted as $f|_g$, so that $f|_g = f$ if g=1; otherwise, f=don't_care. Thus, $f|_g \wedge g = f \wedge g$. We say two formulas A and B are equi-satisfiable, denoted as $A \Leftrightarrow_{SAT} B$, if satisfiability of one implies that of the other, and vice versa. We use |S| to denote the size of a set S.

Path formulas using CNF: The path reasoning used in stateless model checking is now described. Let $s_i \equiv \langle c_i x_i \rangle$ denote a state, and $T(s_i s_{i+1})$ denote the state transition relation. A path is a sequence of successive states, denoted as $\pi^{0,k} = (s_0, \ldots, S_k)$, satisfying the predicate $$T^{0,k} \stackrel{def}{=} \bigwedge_{0 \le i < k} T(s_i, s_{i+1}) \tag{9}$$

with $T^{0,0}=1$. A path has length k if it makes k transitions. A BMC instance comprises checking if an LTL (Linear Temporal Logic) property $\phi$ can be falsified in exactly k steps from some initial state $\psi$ of the following formula:

$$BMC^k(\psi, \phi) \stackrel{def}{=} \psi(s_0) \wedge T^{0,k} \wedge \neg \phi(s_k) \tag{10}$$

where $\phi(s_k)$ denotes the predicate that $\phi$ holds in state $s_k$, and $\psi(s_0)$ denotes the predicate that $\psi$ holds in state $s_0$. Given a bound n, BMC iteratively checks the satisfiability of $BMC^k$ for using an SMT/SAT solver.

Similarly, we define a BMC sub-instance $BMC^{k,k+d}$, defined between depth $$k \text{ and } k + d, \tag{11}$$

as $$BMC^{k,k+d}(\psi, \phi) \stackrel{def}{=} T^{k,k+d} \wedge \psi(s_k) \wedge \neq \phi(s_{k+d})$$

where the predicate $\psi(s_k)$ denotes that $\psi$ holds in state $s_k$. Note, unlike state-based method, there is no quantification step.

Reachability Computation using DNF: Given an initial control state $c_0$ and set of initial values $(x_1 = e_{0,1}; x_2 = e_{0,2}; \ldots x_n = e_{0,n})$, the initial state I is represented as $$I \stackrel{def}{=} (C = c_0) \wedge \bigwedge_{k=1}^{n} (x_k = e_{0,k}). \tag{12}$$

Similarly, given a set of control states $\rho \subseteq C$, a corresponding set of states $D_\rho(C,X)$, is represented disjunctively as union of subformulas, $$D_\rho = \bigvee_{c \in \rho} (C = c) \wedge f^B \wedge f^I. \tag{13}$$

Given a transition relation T(C, X, C', X'), and a set of states $D_\rho(C,X)$, as a state-based symbolic reachability analysis comprises a series of image computations. Let $f_{(x/x')}$ denote the substitution of X' variables in f by the corresponding X. Then, we define the image operation Im g on a given set $D_\rho$ as follows:

$$Img(D_\rho) \stackrel{def}{=} (\exists_{C,X}\, T \wedge D_\rho)_{(X/X', C/C')}. \tag{14}$$

Using (7), one can obtain the following $$Img(D_\rho) \stackrel{def}{=} \left(\exists_{C,X} \bigvee_{\Gamma(c_i,c_j)=1, c_i \in \rho} (T_{ij} \wedge D_\rho)_{(X/X', C/C')}\right. \tag{15}$$

$$= \bigvee_{\Gamma(c_i,c_j)=1, c_i \in \rho} (\exists_{C,X}\, (T_{ij} \wedge D_\rho))_{(X/X', C/C')} \tag{16}$$

$$= \bigvee_{\Gamma(c_i,c_j)=1, c_i \in \rho} \left(\bigvee \left(\exists_{X^B,C}\, f^B_{i,j}\right) \wedge \left(\exists_{X^I,C}\, f^I_{i,j}\right)\right)_{(X/X', C/C')} \tag{17}$$

where we represent $(T_{ij} \wedge D_\rho)$ in DNF form $\vee (f_{i,j}^B \wedge f_{i,j}^I)$, with $f_{i,j}^B$ and $f_{i,j}^I$ denoting the sub-formulas corresponding to Boolean logic and Presburger arithmetic.

A control flow graph (CFG) G=(V,E,r) consists of a set of nodes V corresponding to control states, a set of directed control flow edges E, and an entry node r. A CFG is obtained from an EFSM M by ignoring the enabling and updated transitions, i.e., we obtain a CFG from EFSM M with V=C, E={(c,c')|Γ(c,c')=1}, and r=SOURCE.

Figure 5:
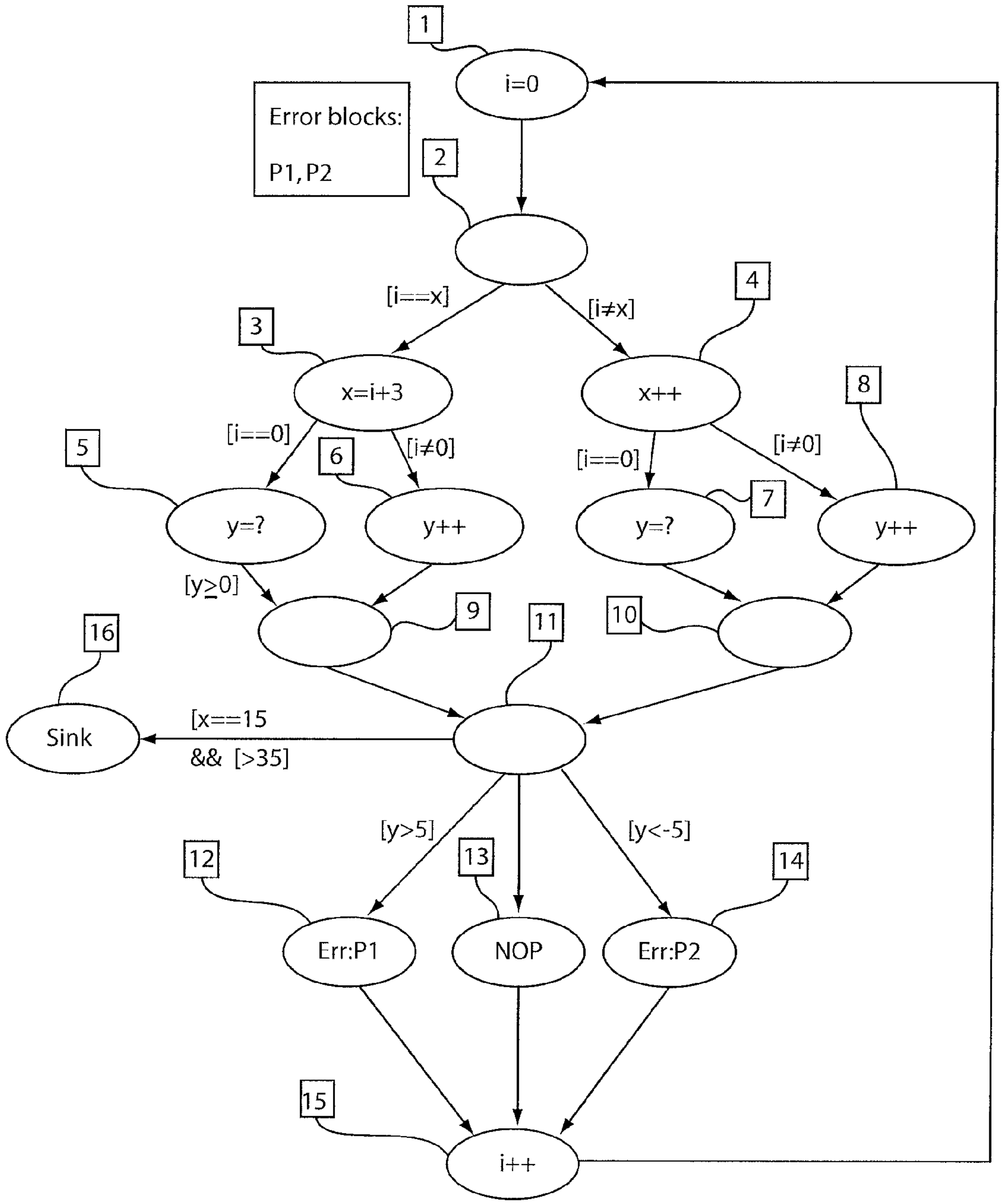
FIG. 5 is a finite state model of or the C program of FIG. 4.

Example: Consider a low-level C program foo as shown in FIG. 4, with its EFSM M shown in FIG. 5. Referring to FIG. 5, control states 1-15, shown as boxes, correspond to control points in the program of FIG. 4. Note, each control state is identified with a number in the attached small square box. For example, ERROR blocks 12 and 14 correspond to the assertions P1 and P2 in lines 19 and 20 of FIG. 4, respectively. Update transitions of data path expressions are shown at each control state. A transition edge between control states in the EFSM corresponds to control flow between the associated control points in the program of FIG. 4. Each such edge is associated with an enabling predicate.

A control path is a sequence of successive control states, denoted as $\gamma^{0,k} = (c_0, \ldots, c_k)$, satisfying the predicate $$\Gamma^{0,k} \stackrel{def}{=} \bigwedge_{0 \le i < k} \Gamma(i, i+1) \tag{18}$$

with $\Gamma^{0,0}=1$. A control state reachability (CSR) analysis is a breadth-first traversal of the CFG where a control state b is one step reachable from a iff $\Gamma(a,b)=1$, i.e., $$CSR(\tilde{c})=\{b \mid a\in\tilde{c}, \Gamma(a,b)=1\} \quad (19).$$

We use $CSR^d(\tilde{c})$ to denote d successive CSR on the set a $\tilde{c}$. At a given sequential depth d, let R(d) represent the set of control states that can be reached statically, i.e., ignoring the guards, in one step from the states in R(d−1), with $R(0)=c_0$, i.e., $R(d)=CSR^d(R(0))$. Computing CSR for the CFG of M (FIG. 4), we obtain the set R(d) for 0≤d≤8 (FIG. 5): R(0)={1}, R(1)={2}, R(2)={3.4}, R(3)={5,6,7,8}, R(4)={9,10}, R(5). {11}, R(6)={12,13,14}, R(7)={15}, and R(8)={1}. We use the control state reachability information to simplify our both state-based and state-less computation. To do such computation efficiently, we use a path balancing technique to reduce the size of the set R(k).

We explain briefly with an example CFG M (FIG. 5), a NOP block 13 is added in the control path 11→15 to balance it with the control paths 11→12→15 and 11 →14→15, i.e., to have same path lengths. Without the NOP block 13, we would have obtained a large reachable set R. As an example, compare R(7)={1,15} (without NOP block 13) with R(7)={15} (with NOP block). One observes that without such balancing, the size of the reachable set R(k) becomes larger at deeper depth.

Modeling C to EFSM: the model building step from a given C program under the assumption of a bounded heap and a bounded stack is now described. We obtain first a simplified CFG by flattening the structures and arrays into scalar variables of simple types (e.g., Boolean and integer). We handle pointer accesses using direct memory access on a finite heap model, and apply standard slicing and constant propagation. We do not inline non-recursive procedures to avoid blow up, but bound and inline recursive procedures up to some user-defined depth. From the simplified CFG, we build an EFSM where each block is identified with a unique id, and a control state variable C denoting the current block id. We construct a symbolic transition relation for C, that represents the guarded transitions between the basic blocks as given by Eq. (6). For each data variable, we add an update transition relation based on the expressions assigned to the variable in various basic blocks in the CFG as given by Eq. (8). We use Boolean expressions and arithmetic expressions to represent the update and guarded transition functions. The common design errors are modeled as ERROR blocks.

In the sequel, we use $v^d$ to denote the unrolled variable v at depth d during BMC unrolling. We define a Boolean predicate $B_r\equiv(C=r)$. We consider the reachability of an ERROR block Err from a SOURCE block Src, i.e., $\neg\phi=F(B_{Err})$, where F is the LTL operator.

Figure 6:
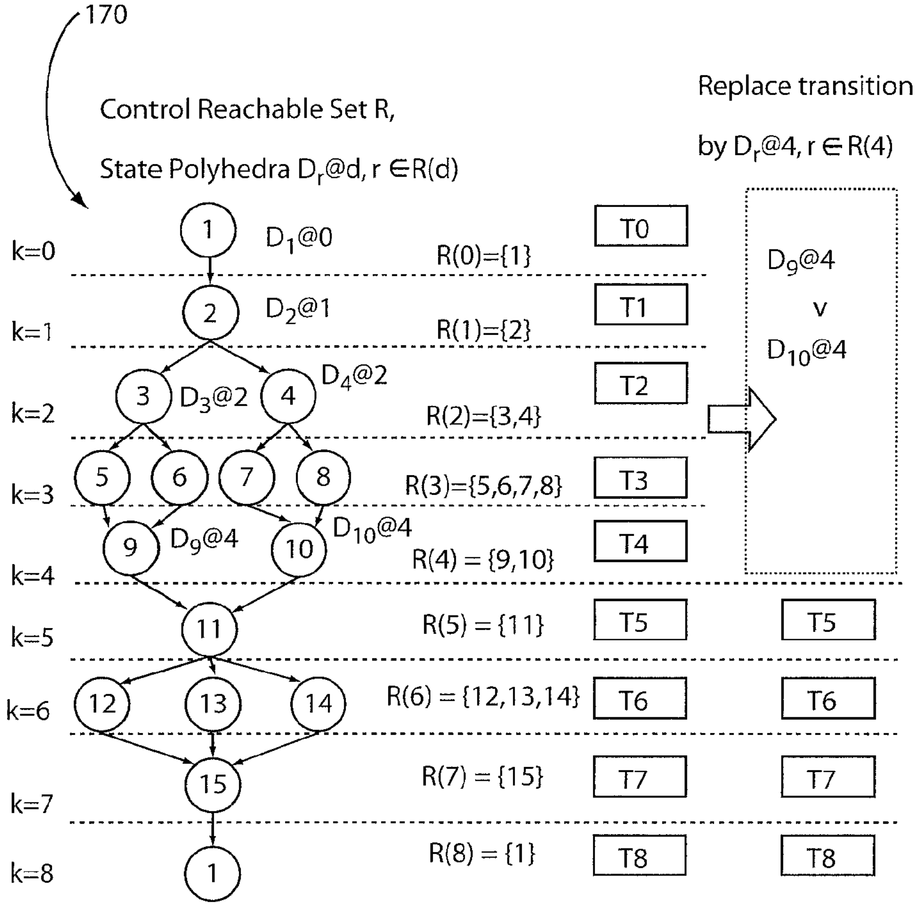
FIG. 6 is a control flow graph showing unrolled transition relations and states of the model of FIG. 5 and program of FIG. 4.

Hybrid Model Checking (HMC): Basic Strategy. Consider the low-level C program foo and its EFSM M shown in FIGS. 4 and 5. FIG. 6 includes control states 1-15 as depicted in FIG. 5. We obtain an unrolled CFG 170 by simply unwinding the CFG up to depth k=8 as shown in FIG. 6. Each program (concrete) path in a BMC instance up to depth k, is an instance of an (abstract) control path in the unrolled CFG. As the unrolled depth increases, a number of paths (and control paths) and their lengths also increases, thereby, making each successive BMC instance increasingly harder to solve. As shown in FIG. 6, the number of control paths to reach ERROR block 12 at k=6 from block 1 at k=1 is 4; however, from block 11 at k=5 it is 1. If we replace the unrolled transitions T0-T4 (denoted by a dotted rectangle) by a reachable set at k=4, we can potentially reduce the size of the BMC instances for k>4. Let $D_{c@k}$ denote a disjunct state set computed for each control state c at depth k from the initial state. As shown, we replace T0-T4 unrolled transitions by $D_{9\,@4}\vee D_{10@4}$. This will enables us to do a deeper search using BMC.

In the hybrid approach, we solve a series of decision problems ω:

$$\omega \stackrel{def}{=} (BMC^{k,k+d}(\psi,\phi)\wedge(\psi=sc)) \quad (20)$$

where sc denotes a state constraint corresponding to the set of states computed symbolically from the initial state I . To overcome the memory blowup during image computations, we employ three strategies: 1) We do not store the reachable set at every intermediate depth. Rather, we store them only for a current depth. The image computed for a given depth is translated into an SMT (LIA) formula as initial state constraint for SMT-based BMC. 2) When the size of the state set, as determined by the size of Presburger formula, is above some threshold, we partition the set. We compute image computation on each partitioned state in some order, as determined by some prioritization heuristics. 3) For image computation on state set $D_\rho$ we do not build the transition of the entire model. Instead, we build a projected transition relation $T|_{D_\rho}$. We do not store $T|_{D_\rho}$ and $D_\rho$ after each image computations. Note, R is the control state reachability information. Further, we use the path balancing techniques to keep the size of R(k). We interleave solving decision problems and reachable state computations, guided by various heuristics.

In the present approach, we avoid computing fixed-point computation. Note that for non-termination programs, the fixed-point computation may not terminate always as program verification is undecidable in polyhedra abstract domain. For terminating programs, fixed-point computation terminates after L steps, where L represents the longest non-terminating path in the program. In the present approach, we avoid expensive accumulation of reachable states, and hence avoid fixed-point computation. To guarantee completeness, one can use completeness criteria to obtain a completeness threshold bound CT in BMC.

For a given ψ, and a SINK state, one can determine that CT has been reached, i.e., k=CT , if the following formula is unsatisfiable:

$$LFP^{k,k+d} \stackrel{def}{=} \left(BMC^{k,k+d}(\psi,\phi)\wedge\bigwedge_{k\le i<j\le k+d}(s_i\neq s_j)\right) \quad (21)$$

In particular, an improved criteria may be employed that solves formula of size O(d), as opposed to $O(d^2)$, as given by the following:

$$NTP^{k,k+d} \stackrel{def}{=} (BMC^{k,k+d}(\psi,\phi)\wedge(\phi=B_{SINK})) \quad (22)$$

Lemma 1: For terminating programs, $NTP^{k,k+d}$ is satisfiable if and only if $LFP^{k,k+d+1}$ is satisfiable. We say a BMC search is complete for a given ψ, when the completeness threshold criteria is satisfied.

IMAGE COMPUTATION: Control state reachability information computed on the CFG can be used to simplify image computations as follows. Given a set of states $D_\rho(C,X)$ with corresponding control states $\rho\subset C$ , and T transition relation, we obtain a projection of T with respect to $D_\rho$, i.e., $T|_{D_\rho}$ as follows:

$$T \wedge D_\rho = \bigvee_{c_i, c_j \in C, \Gamma(c_i, c_j)=1} T_{ij} \wedge D_\rho \tag{23}$$

$$= \underbrace{\bigvee_{c_i \in \rho, c_j \in CSR(\rho)} T_{ij}}_{T_{\rho,CSR(\rho)}} \wedge D_\rho \tag{24}$$

Clearly, $T_{\rho,CSR(\rho)}$ denotes $T|_{D_\rho}$. Let $D_\rho = \vee_{c_i \in \rho}(C=c_i) \wedge f_i^B \wedge f_i^I$ and $T_{\rho,CSR(\rho)} = \vee_{c_i \in \rho, c_j \in CSR(\rho)}(C=c_i) \wedge (C'=c_j) \wedge g_{ij}^B \wedge g_{ij}^I$ be the respective DNF forms.

Note, the number of disjuncts in $T_{\rho CSR(\rho)} \wedge D_\rho$ are bounded by the number of control edges $(c_1, c_j)$. In sequential programs, a number of outgoing edges from a control node is 2, in which case the number of disjuncts will be 2 ρ. Thus, instead of building an entire T beforehand, one can build $T_{\rho CSR(\rho)}$ on-the-fly for a given $D_\rho$ using the CSR information. Since $T_{\rho,CSR(\rho)}$, is much smaller than the T, the peak memory requirement can be reduced significantly. If a state corresponds to a set of control states ρ at certain depth, then its image state corresponds to a subset of CSR(ρ), i.e., Lemma 2: Let $D'_\rho = \text{Im } g(D_\rho)$. If $\rho \in (k)$, then $\rho' \subset CSR(\rho) \subset R(k+1)$.

Lemma 3: If $D_\rho$, $\subset \text{Im } g^k$ (I), then $\overline{p} \subset R(k)$.

State Decomposition: As the DNF representation are not canonical, the polyhedrons get fragmented after being propagated through branching and reconverging points during successive image computations. Though heuristics algorithms exist to compact the representations, memory blow up cannot be avoided when there are many branches. To avoid computing images for large state representation, one can decompose it further. Given a state $D_\rho$ and its partition set $\{D_{1,\rho_1}, \ldots D_{i,\rho_m}\}$ such that $D_\rho = \vee_i^m (D_{i,\rho_i}), \rho = \cup_i^m \rho_i$, an image computation can be partitioned disjunctively into simpler subproblems, i.e. Lemma 4: $\text{Im } g(D_\rho) = \vee_i^m \text{Im } g(D_{i,\rho_i})$. We will assume in our following discussion that for a given $D_\rho$, $\exists k, \rho \subset R(k)$, unless otherwise explicitly stated.

In general, finding a good partition is a difficult problem. On one hand, larger sized partitions make each subproblem more difficult to solve but reduce the partitioning overhead due to repeated work. Smaller sized partitions result in easier subproblems, but may significantly increase the partitioning overhead. One goal is to use low overhead partitioning heuristics based on the control state reachability information. Note, the size of image state depends on both the size of transition relation and the input state $D_\rho$. To minimize the need for post image state partitioning, we provide a simple mechanism to estimate the size of the state and image state, and propose a greedy partition strategy using this.

Given a state $D_\rho = \vee_{c_i \in \rho}(C=c_i) \wedge f_i^B \wedge f_i^I$, we define size of $D_\rho$ denoted as size($D_\rho$) as follows: $\text{size}(D_\rho) = \Sigma_{c_i \in \rho} \#P(f_i^I) + \#B(f_i^B)$ (25) where #P gives the number of polyhedra in the Presburger formula $f_i^I$, and #B gives the number of BDD nodes in the Boolean logic. We now present a simple mechanism to estimate size of Im $g^k$ ($D_\rho$).

We define the size of $T_{\rho,CSR(\rho)} \wedge D_\rho$ denoted as size($TD_\rho$) as follows:

$$\text{size}(TD_\rho) = \Sigma_{c_i \in \rho} \#P(f_i^I) * (\Sigma_{c_j \in CSR(\rho)} \#P(g_{ij}^I)) + \Sigma_{c_i \in \rho} \#B(f_i^B) * (\Sigma_{c_j \in CSR(\rho)} \#B(g_{ij}^B))$$

Noting that the size of Im $g(D_\rho)$ depends on the size of $T_{\rho CSR(\rho)} \wedge D_\rho$, we can use size($TD_\rho$) as its estimated size as well. Similarly, we define the size of $T_{\rho,CSR(\rho)} \wedge T_{CSR(\rho),CSR^2(\rho)} \wedge \underline{D\rho}$ denoted as size($T^2D_\rho$) as shown in TABLE 1. Note, $\overline{\text{size}}(T^2D_\rho)$ gives an overestimation in the size of $T^2D_\rho$. Similarly, we can obtain an overestimation in the size of $T^kD_\rho$ representing a conjunction of D with k conjunction of T. Such an overestimation is easier to compute than computing size($T^kD_\rho$) where one needs to enumerate disjuncts corresponding to a control paths of length k.

TABLE 1. Size estimation of $T^2D_\rho$ $$T_{\rho,CSR(\rho)} \wedge T_{CSR(\rho),CSR^2(\rho)} \wedge D_\rho =$$

$$\bigvee_{c_i \in rho c_j} \bigvee_{c_j \in CSR(rho)} \bigvee_{c_k \in CSR^2(\rho)} (f_I^i \wedge g_{ij}^I \wedge g_{jk}^I) \wedge (f_i^B \wedge g_{ij}^B \wedge g_{jk}^B) \text{size}(T^2 D_\rho) =$$

$$\sum_{c_i \in \rho} \sum_{c_j \in CSR(\rho)} \sum_{c_k \in CSR^2(\rho)} (\#P(f_i^I) * \#P(g_{ij}^I) \#P(g_{jk}^I)) +$$

$$\sum_{c_i \in \rho} \sum_{c_j \in CSR(\rho)} \sum_{c_k \in CSR^2(\rho)} (\#B(f_i^B) * \#B(g_{ij}^B) \#B(g_{jk}^B)) \leq$$

$$\sum_{c_i \in \rho} \left( \#P(f_i^I) * \sum_{c_I \in \rho, c_j CSR(\rho)} \#P(g_{ij}^I) \right) * \left( \sum_{c_j \in CSR(\rho), c_k \in CSR^2(\rho)} \#P(g_{jk}^I) \right) +$$

$$\sum_{c_i \in \rho} \left( \#B(f_i^B) * \sum_{c_I \in \rho, c_j CSR(\rho)} \#B(g_{ij}^B) \right) *$$

$$\left( \sum_{c_j \in CSR(\rho), c_k \in CSR^2(\rho)} \#B(g_{jk}^B) \right) + \stackrel{def}{=} \overline{size}(T^2 D_\rho)$$

Though the size of Im $g^k$ ($D_\rho$) depends on the result of existential quantification of $T^kD_\rho$, we use $\overline{\text{size}}(T^kD_\rho)$ as an estimate of its size, denoted as size (Im $g^kD_\rho$). Based on the sizes of $D_\rho$ and its $k^{th}$ image state, as estimated above, we define a predicate NP($D_\rho$,k) as follows:

$$NP(D_\rho, k) \stackrel{def}{=} (\text{size}(D_\rho) < t_{size}) \wedge (\text{size}(Img^k D_\rho) < k * i_{size}). \tag{26}$$

If NP evaluates to true, we choose to partition the state, $D_\rho$. We present the partition problem formally. Given: a state threshold size $t_{size}$, image depth k, a single image threshold size $i_{size}$, a state $D_\rho$, then partition $D_\rho = \{D_{1,\rho_1}, \ldots D_{m,\rho_m}\}$ such that for $1 \leq i \neq j \leq m$, NP($D_{i,\rho_i}$,k) is false, and m is minimum. One can use more expensive methods such as graph partitioning techniques to solve the optimization problem, especially on larger problems where the relative time for computing the partitions may still be relatively insignificant to the solver runtime. Instead, we employ two greedy procedures, Partition and Group to obtain such a partition, that is geared towards minimizing the number of partitions and obtaining a good balance among the partition sizes.

Partition:

1. Given a state $D_\rho$ D. If NP($D_\rho$, k)=false, we stop; otherwise we continue.
2. Let $\rho = \{c_1, \ldots, c_n\}$. Initial $F = \{D_{1,\rho_1}, \ldots, D_{n,\rho_n}\}$ such that $rho_i = \{c_i\}$.
3. For each $D_{i,\rho_i} \in F$, if NP($D_{i,\rho_i}$,k)=false, we bi-partition $D_{i,\rho_i}$ i.e., $f_i^B \wedge f_i^I$ into $D_{a,\rho_i}$, and $D_{b,\rho_i}$. We update F, i.e., $F = F \backslash \{D_{i,\rho_i}\} \cup \{D_{a,\rho_i}, D_{b,\rho_i}\}$.
4. We continue with the previous Step 3, until all partitions in F satisfy the predicate NP.

Such a partition technique may generate a large number of partitions. To minimize the number of partitions, we use the following ranking or grouping procedure:

Group:

1. Given a set of $F=\{D_{1,\rho_1}, \ldots D_{m,\rho_m}\}$ of partitions $D_{1,\rho_1}$, such that $\rho_i \in R(k)$ for $1 \le i \le m$, and for some k.
2. Sort F in the order of increasing partition size
3. Let $D_{12,\rho_1 \cup \rho_2} = D_{1,\rho_1} \vee D_{2\ \rho_2}$. If $D_{12,\rho_1 \cup \rho_2}$, satisfies NP predicate, we update F, i.e., $F=F \setminus \{D_{1,\rho}, D_{2,\rho}\} \cup \{D_{12,\rho_1}\}$ and continue with Step 1 of this procedure. Otherwise, we stop.

This partition heuristic is fairly cheap to compute.

State Prioritization: We discuss state prioritization heuristics to prioritize the disjunct states in F. Such prioritization is useful when the goal is falsification, i.e., to find the counter-examples. Deeper state (dfs): To target error blocks that are sequentially deep, it may be useful to prioritize the state based on deeper depth. A disjunct state $D_{\tilde{c}_k} \in F$ is given higher priority over $D_{\tilde{c}_j} \in F$, if k>j. Shallow state (bfs): To target error blocks that are shallow, and the control reachable state R(k) is large at lower depths, it may be useful to prioritize the states on shallow depth. In other words, a disjunct state $D_{\tilde{c}_k} \in F$ is given higher priority over $D_{\tilde{c}_j} \in F$, if k<j. Lighthouses (lh): Lighthouses, as noted earlier, are intetmediate "state predicates" that can potentially guide the search to the target error node. We select dominators as lighthouses, as it is a convergent point in a CFG. We also use loop exit nodes as lighthouses, because loop exit conditions do not occur frequently.

BMC SIMPLIFICATION: Let $\tilde{c}_k \in R(k)$. A set of control paths of length d, starting from $c \in \tilde{c}_k$, denoted as $\tilde{\gamma}_{\tilde{c}_k d}$, is given by $$\tilde{\gamma}_{\tilde{c}_k,d}=\{\gamma^{k,k+d} \mid \forall_{k \le i \le k+d} c_i \in CSR^i(\tilde{c}_k)\} \quad (27)$$

For a given BMC sub-instance $BMC^{k,k+d}$, we can use $\tilde{\gamma}_{\tilde{c}_k,d}$ to constrain it, i.e., $$BMC^{k,k+d}|_{\tilde{\gamma}_{\tilde{c}_k,d}}$$

by effectively slicing away the statically unreachable control paths:

$$BMC^{k,k+d}\Big|_{\tilde{y}_{\tilde{c}_k,d}}(\psi,\phi) \stackrel{def}{=} T^{k,k+d}\Big|_{UBC(\tilde{y}_{\tilde{c}_k,d})} \wedge \psi \wedge \neq \phi(s_{k+d}) \quad (28)$$

$$UBC\left(\tilde{y}_{\tilde{c}_k,d} \stackrel{def}{=} \bigwedge_{0 \le i < d,} \bigwedge_{r \notin CSR^i(\tilde{c}_k)} \neg B_r^{k+i}\right) \quad (29)$$

where UBC, the Unreachable Block Constraint uses statically unreachable control states to simplify $T^{k,k+d}$ using on-the-fly size reduction techniques such as functional or structural hashing and constant folding. Basically, if a control state $r \notin R(d)$, then the unrolled transition relation of variables that depend on r can be simplified, as described in the following.

Recall, we use a Boolean predicate $B_r \equiv (C=r)$, where C is the program counter that tracks the current control state. Also, $v^d$ denotes the unrolled variable V at depth i during BMC unrolling. Consider again model M in FIG. 3_, where the next state of variable x is defined as next(x)=$(B_3||B_4)$?i+3: x+1; (using the C language notation for cascaded if-then-else). For depths i=1,2, blocks 3,2$\notin$R(k), and therefore, $B_3{}^k=B_4{}^k=0$. Using this unreachability control state information, we can hash (reuse) the expression representation for $x^{k+1}$ to that for $x^k$, i.e., $x^{k+1}=X^k$. Expression reuse considerably reduces data path expressions in each BMC instance. As no new control path are added, we have:

$$Lemma5:\ BMC^{k,k+d}|_{\tilde{\gamma}_{\tilde{c}_k,d}}(\psi,\phi) \Rightarrow_{SAT} BMC^{k,k+d}\Big|_{\tilde{\gamma}_{\tilde{c}_k,d}}(\psi,\phi) \text{ for some } d \ge 0.$$

$$Lemma6:\ BMC^{k,k+d}\Big|_{\tilde{\gamma}_{R(k),d}}(\psi,\phi) \Leftrightarrow_{SAT} BMC^{k,k+d}|_{\tilde{\gamma}_{\tilde{c}_k,d}}(\psi,\phi) \text{ for some } d \ge 0.$$

HMC: PROCEDURE: In the following, we present the combination procedure HMC in accordance with the present principles. Given an Err Block, and initial states/, we interleave BMC and Image computations to show the reachability of Err block from the initial states 1. Let F represent a set of states $D_\rho$ D. From lemma 3, we have p E R(k) for some k. Let F be initialized with I i.e., F={I}. Such a state set can be used to create a BMC sub-problems which is simpler than the BMC instance as discussed below. We will refer to such a set as a frontier set. A BMC computation is carried as follows:

1. Pick a state $D_{\tilde{c}_k} \in F$ with highest priority.
2. Select some depth bound d. (Alternatively, a time bound can be selected).
3. Compute CSR from the control states $\tilde{c}_k$ for d depth.
4. Perform BMC between k≤i≤k+d as follows:
   - 4a. Simplify the unrolled transition relation $T^{k,k+i}$
   - 4b. Encode the state $D_{\tilde{c}_k}$ into SMT(LIA) formula Be.
   - 4c. Encode BMC instance using simplified Tk,k+i into SMT(LIA) formula.
   - 4d. Check for completeness: If SINK $\in CSR^i(\tilde{c}_k)$ and if no control state other than SINK is reachable from $D_{\tilde{c}_k}$, then remove the state $D_{\tilde{c}_k}$ from F.
   - 4e. Check for counter-example: If Err$\in CSR^i(\tilde{c}_k)$ and if Err is reachable from $D_{\tilde{c}_k}$, then terminate the procedure with a return value FAIL as Err block is reachable.
5. Switch to image computation.

A symbolic image computation is carried out as follows:

1. If F=$\varphi$, terminate the procedure with a return value PASS.
2. Prioritize the set F as described above.
3. If size of the states in F is above a memory bound $f_{size}$, then scale up $f_{size}$, and switch to BMC.
4. Pick a state $D_{\tilde{c}_k} \in F$ with highest priority.
5. If Err $\in \tilde{c}_k$, terminate the procedure with a return value FAIL.
6. Simplify the transition relation T|ρ,CSR(ρ)
7. Obtain an image img using simplified transition relation
8. Remove the state $D_{\tilde{c}_k}$ from F.
9. Partition img if needed as described above.
10. Update F with img or its partitions.
11. Group the state sets in F as described in Section IV-A
12. Continue with Step 1 of this procedure.

Note, BMC and image computations are fairly independent procedures, and can easily be parallelized in a distributed environment. An illustrate HMC procedure following the above is depicted in pseudocode in Method 1.

METHOD 1: HMC

```
input: CFG: G; Initial State: I
    Transition: T, Error Block: Err
output: FAIL/PASS

F = {I}{Initial states}
while true do
```

-continued

METHOD 1: HMC

{Perform CSR, BMC for bounded depth d using F}
{Pick a state in the order of priority}
for all $D_{\tilde{c}_k} \in F$, $\tilde{c}_k \in R(k)$ do
  Compute_CSR(CFG, $\tilde{c}_k$, d) {Section II-G}
  for all $k \le i \le k + d$ do
    $BMC^{k,k+i}_{\tilde{\gamma}_{\tilde{c}_k,i}} := BMC^{k,k+i}|_{\tilde{\gamma}_{\tilde{c}_k,i}}$ {Section V}
    sc = Enc2LIA($D_{\tilde{c}_k}$) {Encode the state into SMT(LIA) formula}
    {Completeness check, a block than SINK reachable?}
    if SINK $\in$ R(k) then
      $is\_sat = SAT\left(BMC^{k,k+i}_{\tilde{\gamma}_{\tilde{c}_k,i}}(\psi, \phi) \wedge (\psi = sc) \wedge \phi = \neg B_{SINK}\right)$
      if (is_sat = false) then
        F := F \ $D_{\tilde{c}_k}$ {Remove the state, as termination reached}
      end if
    end if
    {Check for CEX}
    if Err $\in$ R(k) then
      $is\_sat = SAT\left(BMC^{k,k+i}_{\tilde{\gamma}_{\tilde{c}_k,i}}(\psi, \phi) \wedge (\psi = sc) \wedge \phi = \neg B_{Err}\right)$
      if (is_sat = true) then
        return FAIL {Err is reachable}
      end if
    end if
  end for
end for {Compute Reachable States}
while true do
  if F = θ then
    return PASS Err block is unreachable
  end if
  Prioritize(F) {State prioritization}
  if $\sum_{d \in F} size(d) > f_{size}$ then
    $f_{size} = 2 * f_{size}$ {scale up}
    break {Switch to BMC}
  end if
  {Pick $D_\rho \in F$ with top priority}
  if Err $\in \rho$ then
    return FAIL {Err block is unreachable}
  end if
  $T_{\rho,CSR(\rho)} = T|_{D_\rho}$ {Build a projection}
  img = Im g($D_\rho$) {Compute image using $T_{\rho,CSR(\rho)}$}
  F := F \ $D_\rho$ {remove the processed state}
  F := F ∪ Partition_State(img) {Partition the state if needed}
  F := Group(F) {Group the state sets}
end while
end while Theorem 1: For terminating programs, the procedure HMC will eventually terminate, with a correct decision PASS/FAIL, where PASS indicates the Err block is unreachable, while FAIL denotes that Err block is reachable.

Witness Trace Construction: We now describe an efficient way to generate witness trace without unrolling the transition to the length of the entire trace. Let $$D_{1,\tilde{c}_{k_1}} \ldots D_{n,\tilde{c}_{k_n}}$$

denote the sequence of states during the image computations. Let $$D_{n,\tilde{c}_{k_n}}$$

be the state constraint sc used in SMT-based BMC to obtain the witness trace segment. We start from this witness trace segment. We use data flow analysis (on the single trace) to obtain the needed data values in the control block at the start of the trace, i.e., at depth $k_n$. These required values become our new goal. We then use SMT-based BMC to find the error trace segment with start depth $k_{n-1}$ and the state constraint $$D_{n-1,\tilde{c}_{k_{n-1}}}.$$

This process is repeated until we find all the segments of the error trace. Note, we are not required to store the intermediate states $$D_{i,\tilde{c}_{k_i}},$$

in memory. During image computations, we carry out a non-blocking disc I/O operations to write out the intermediate states. This contributes a very insignificant overhead during state traversal. Since we generate witnesses as a post-processing step, disc read for intermediate state is not carried out until then, and therefore, there is no overhead of disc read during state traversal.

In accordance with the present principles, a hybrid model checking method is provided that interleaves state-based and state-less model checking in a first order decidable logic theory. We intertwine the strengths of the two approaches in a tightly integrated framework. We use control flow reachability information to simplify the transition relation for both BMC and image computations. We avoid storing states and do not require fixed-point computation. We provide a simple mechanism to partition and group state sets for a robust image computation. Further, we provide state prioritization techniques targeted to find witness. Experimental results show that such a hybrid approach performs better than either BMC or symbolic traversal in isolation, and, the presented approach provides a robust state space search solution as compared to either state-based or state-less approach in isolation. It has been specifically targeted for analyzing large systems by making the method parallel-izable.

Figure 7:
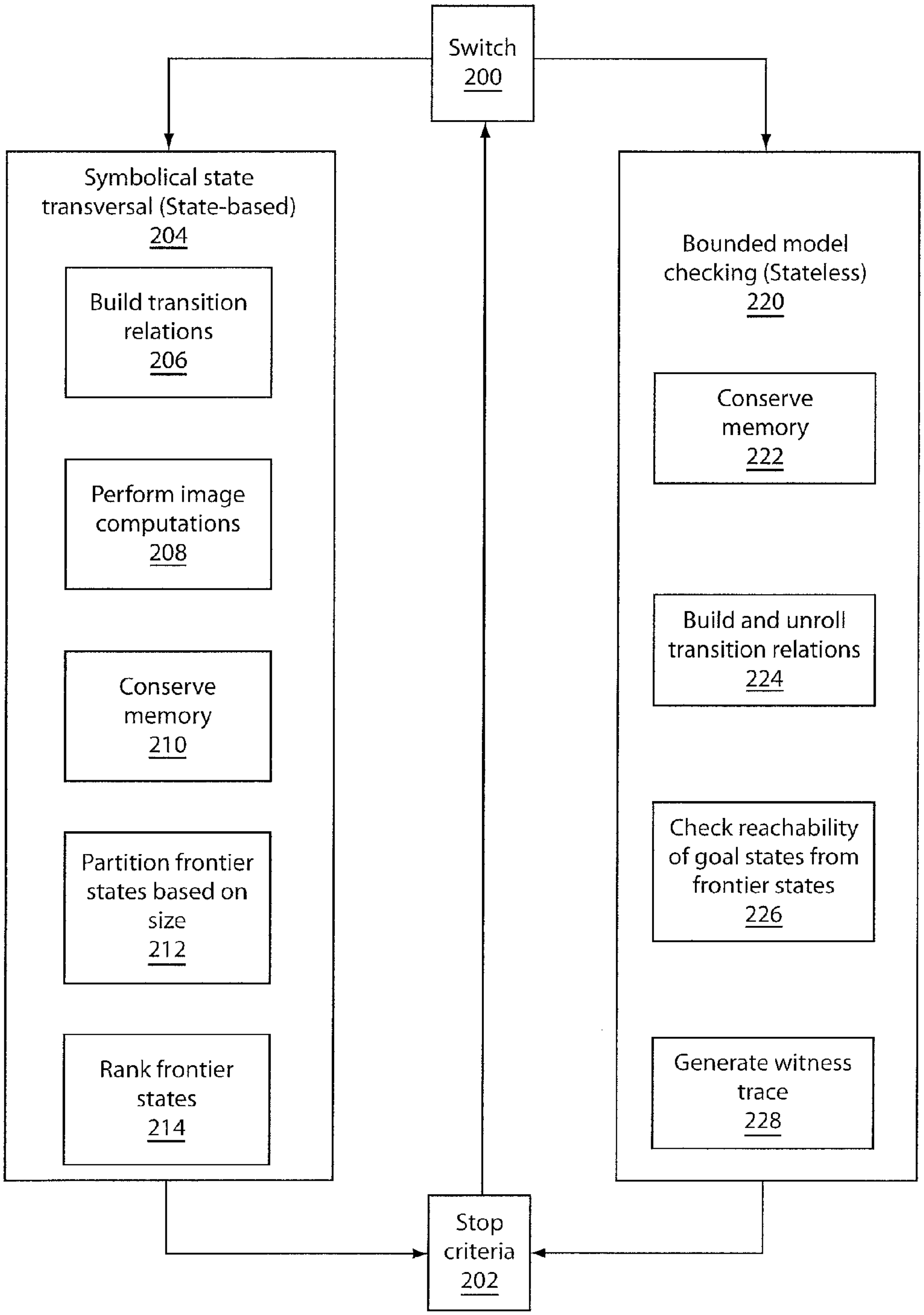
FIG. 7 is a block/flow diagram showing a model checking system/method which combined stateless and state-based model checking in accordance with another embodiment.

Referring to FIG. 7, a system/method for symbolic model checking of sequential systems is illustratively described. In block 200, alternating between state-based and state-less symbolic model checking methods is handled in accordance with switching criteria. For example, a switch from the state-based method to the state-less method can occur after a size of stored frontier states becomes greater than a threshold size. In addition, a switching from the state-less method to the state-based method may occur when one or more of: time exceeds a threshold bound; and all the paths from the frontier states are explored up to a bounded depth or a completeness threshold, whichever is smaller. The completeness threshold bound is preferably determined by one of the following satisfiability checks: a loop free path check, wherein the check includes determining whether there a exists a path without a repeating state that can be made longer; a non-terminating path check, wherein the check includes determining whether there exists a path terminating in a sink control state that can be made longer, wherein sink state does not have any outgoing transition. In block 202, the alternating is performed until one of the following occur: no frontier state remains to select from; all goal states are shown reachable from the frontier states; and available resources are exhausted.

In block 204, symbolic state traversal (ST) is performed to compute and store new frontier states in successive steps of the state-based method. Each step includes building transition relations between successive sequential depths using control flow reachability information of the system in block 206, and performing image computations using a transition relation from the frontier states computed in previous steps to obtain image states, wherein the frontier states include a set of states reachable at a depth d from initial states in block 208. The traversal may include a successive image computation wherein image states at each depth are over-approximated using an abstract interpretation based technique.

Memory storage may be conserved by removing transitory information in block 210. This may include the following. The building of transition relations may include removing one or more of the transition relations between successive sequential depths soon after their use in the image computation of symbolic state traversal to conserve memory storage space. The image computation may include building one or more of the transition relations between successive sequential depths just before their use in the image computation of symbolic state traversal to conserve memory storage space. The image computation may further include removing one or more of the frontier states from the storage media soon after the state-based method has used them in the image computation.

In block 212, the frontier states may be stored as state disjuncts, wherein each state disjunct comprises a disjunction of Boolean and linear arithmetic expressions. The state disjuncts are partitioned based on their sizes and their image sizes, wherein the size is determined by one of more of the following: a number of Boolean and arithmetic expressions and a number of control states reachable in the state disjuncts. The state-based method may include Presburger arithmetic based symbolic state traversal.

The frontier states are selected by both the methods in a prioritized order that increases the likelihood of reaching the goal states. In block 214, frontier states are ranked. The frontier states are preferably selected in a decreasing order of priority wherein the frontier states which are reachable at greater depth from the initial states are given higher priority. The frontier states may be selected in a decreasing order of priority wherein the frontier states that reach a goal state in a traversal are given higher priority. This ranking carries over into the stateless method as well (see also FIG. 1).

In block 220, bounded model checking (BMC) is performed in the state-less method to check reachability of given goal states from the frontier states along paths of bounded length by building and unrolling the transition relations using control flow information, without computing or storing intermediate reachable states. Further memory saving procedures may also be employed in block 222. In block 224, building and unrolling is performed on the transition relations during their use in the bounded model checking from a selected state of the frontier states. The transition relations are preferably removed soon after their use to conserve memory storage space (block 222).

In block 226, reachability of goal states is performed. E.g., the BMC search uses the frontier states at a position k−1 in the sequence as the initial states and the frontier states at a next position k in the sequence as the goal states, and begins a piece-wise search with k as L, progressively decreasing k until k=2 where the frontier states at position k=1 corresponds to system initial states. In block 228, a witness trace may be generated starting from one or more initial states to one or more goal states using a piece-wise BMC search on a sequence of length L of frontier states leading to one or more goal states. The state-less method may include a Satisfiability Modulo Theory (SMT)-based Bounded Model Checking procedure.

Having described preferred embodiments of a system and method for model checking by interleaving stateless and state-based methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for symbolic model checking of sequential systems, comprising:

alternating between state-based and state-less symbolic model checking methods, stored on computer readable storage media, wherein alternating includes switching from the state-based method to the state-less method after a size of stored frontier states becomes greater than a threshold size, by:

performing symbolic state traversal (ST), using a processor, to compute and store new frontier states in successive steps of the state-based method, wherein each step includes:

building transition relations between successive sequential depths using control flow reachability information of a system; and performing image computations using the transition relations from the frontier states computed in previous steps to obtain image states, wherein the frontier states include a set of states reachable at a depth d from initial states; and performing bounded model checking (BMC), using a processor, in the state-less method to check reachability of given goal states from the frontier states along paths of bounded length by building and unrolling the transition relations using control flow reachability information, without computing or storing intermediate reachable states.

2. The method as recited in claim 1, wherein performing image computation includes building one or more of the transition relations between successive sequential depths just before their use in an image computation of symbolic state traversal to conserve memory storage space.

3. The method as recited in claim 1, wherein building transition relations includes removing one or more of the transition relations between successive sequential depths soon after their use in an image computation of symbolic state traversal to conserve memory storage space.

4. The method as recited in claim 1, wherein building and unrolling the transition relations includes building and unrolling the transition relations during their use in the bounded model checking from a selected state of the frontier states, and removing the transition relations soon after their use to conserve memory storage space.

5. The method as recited in claim 1, wherein performing image computations includes removing one or more of the frontier states from the storage media soon after the state-based method has used them in the image computation.

6. The method as recited in claim 1, wherein the frontier states are stored as state disjuncts, wherein each state disjunct comprises a disjunction of Boolean and arithmetic expressions.

7. The method as recited in claim 6, wherein the state disjuncts are partitioned based on their sizes and their image sizes, wherein the size is determined by one of more of the following: a number of Boolean and arithmetic expressions and a number of control states reachable in the state disjuncts.

8. The method as recited in claim 1, where in the frontier states are selected in a decreasing order of priority wherein the frontier states which are reachable at greater depth from the initial states are given higher priority.

9. The method as recited in claim 1, wherein the frontier states are selected in a decreasing order of priority wherein the frontier states that reach a goal state in a traversal are given higher priority.

10. The method as recited in claim 9, wherein the traversal includes a successive image computation wherein image states at each depth are over-approximated using an abstract interpretation based technique.

11. The method as recited in claim 1, wherein alternating includes switching from the state-less method to the state-based method at an occurrence of one or more of: time exceeds a threshold bound; and all the paths from the frontier states are explored up to a bounded depth or a completeness threshold, whichever is smaller.

12. The method as recited in claim 11, wherein the completeness threshold bound is determined by one of the following satisfiability checks: a loop free path check, wherein the check includes determining whether there a exists a path without a repeating state that can be made longer; a non-terminating path check, wherein the check includes determining whether there exists a path terminating in a sink control state that can be made longer, wherein the sink control state does not have any outgoing transition.

13. The method as recited in claim 11, further comprising removing the frontier state from the media storage soon after the completeness threshold bound is reached.

14. The method as recited in claim 1, wherein alternating is performed until one of the following occur: no frontier state remains to select from; all goal states are shown reachable from the frontier states; and available resources are exhausted.

15. The method as recited in claim 1, further comprising generating a witness trace starting from one or more initial states to one or more goal states using a piece-wise BMC search on a sequence of length L of frontier states leading to one or more goal states.

16. The method as recited in claim 15, wherein the BMC search uses the frontier states at a position k−1 in the sequence as the initial states and the frontier states at a next position k in the sequence as the goal states, and begins a piece-wise search with k as L, progressively decreasing k until k=2 where the frontier states at position k=1 corresponds to system initial states.

17. The method as recited in claim 1, wherein the state-less method includes a Satisfiability Modulo Theory (SMT)-based Bounded Model Checking procedure.

18. The method as recited in claim 1, wherein the state-based method includes Presburger arithmetic based symbolic state traversal.

19. A non-transitory computer readable storage medium comprising a computer readable program for symbolic model checking of sequential systems, wherein the computer readable program when executed on a computer causes the computer to perform the steps of:

alternating between state-based and state-less symbolic model checking methods, stored on computer readable storage media, wherein alternating includes switching from the state-based method to the state-less method after a size of stored frontier states becomes greater than a threshold size, by:

performing symbolic state traversal (ST) to compute and store new frontier states in successive steps of the state-based method, wherein each step includes:

building transition relations between successive sequential depths using control flow reachability information of a system; and performing image computations using the transition relations from the frontier states computed in previous steps to obtain image states, wherein the frontier states include a set of states reachable at a depth d from initial states; and performing bounded model checking (BMC) in the state-less method to check reachability of given goal states from the frontier states along paths of bounded length by building and unrolling the transition relations using control flow reachability information, without computing or storing intermediate reachable states.

20. A system for symbolic model checking of sequential systems, comprising a processor configured to execute:

a model checking program stored on a memory device, configured to alternates between state-based and state-less symbolic model checking methods, wherein a switch from the state-based method to the state-less method occurs after a size of stored frontier states becomes greater than a threshold size;

the model checking program including a state-based module configured to perform symbolic state traversal (ST) to compute and store new frontier states in successive steps by building transition relations between successive sequential depths using control flow reachability information of a system and performing image computations using the transition relations from the frontier states computed in previous steps to obtain image states, wherein the frontier states include a set of states reachable at a depth d from initial states; and the model checking program including a stateless module configured to perform bounded model checking (BMC) to check reachability of given goal states from the frontier states along paths of bounded length by building and unrolling the transition relations using control flow reachability information, without computing or storing intermediate reachable states.

21. The system as recited in claim 20, wherein the frontier states are stored as state disjuncts, each state disjunct comprising a disjunction of Boolean and linear arithmetic expressions such that the state disjuncts are partitioned based on their sizes and their image sizes, where the size is determined by at least one of: a number of Boolean and arithmetic expressions and a number of control states reachable in the state disjuncts.

22. The system as recited in claim 20, wherein a switch from the state-less method to the state-based method occurs when at least one of time exceeds a threshold bound; and all the paths from the frontier states are explored up to a bounded depth or a completeness threshold, whichever is smaller.

* * * * *